(12) United States Patent
Dey et al.

(10) Patent No.: US 12,417,125 B2
(45) Date of Patent: Sep. 16, 2025

(54) MICROSERVICE ARCHITECTURE WITH AUTOMATED NON-INTRUSIVE EVENT TRACING

(71) Applicant: Express Scripts Strategic Development, Inc., St. Louis, MO (US)

(72) Inventors: Sudipto Dey, Parsippany, NJ (US); Jasbir Singh, Morris Plains, NJ (US); Pulla Reddy P. Yeduru, Austin, TX (US); Robert A. Seyss, Lafayette, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 814 days.

(21) Appl. No.: 17/499,966

(22) Filed: Oct. 13, 2021

(65) Prior Publication Data
US 2023/0115419 A1    Apr. 13, 2023

(51) Int. Cl.
*G06F 9/54*       (2006.01)
*G06F 9/445*      (2018.01)
*G06F 9/50*       (2006.01)

(52) U.S. Cl.
CPC ........ *G06F 9/5044* (2013.01); *G06F 9/44505* (2013.01); *G06F 9/546* (2013.01)

(58) Field of Classification Search
CPC ..... G06F 9/5044; G06F 9/546; G06F 9/44505
(Continued)

(56) References Cited

U.S. PATENT DOCUMENTS 9,842,045 B2   12/2017  Heorhiadi
10,009,915 B1*  6/2018  Liu .................. H04W 72/1263
(Continued)

FOREIGN PATENT DOCUMENTS

CN   110505238 A  * 11/2019  ............ H04L 47/62
CN   112118232 A  * 12/2020  ............ H04L 69/22
(Continued)

OTHER PUBLICATIONS

Santana, Matheus; Transparent Tracing of Microservice Application; Apr. 2019 ; ACM publication; Proceedings of the 34th ACM/SIGAPP Symposium on Applied Computing (Year: 2019).*
(Continued)

*Primary Examiner* — April Y Blair
*Assistant Examiner* — Ross Michael Vincent
(74) *Attorney, Agent, or Firm* — Harness IP

(57) ABSTRACT

A computer system includes memory hardware configured to store structured microservice configuration data having multiple microservice entries each associated with one of multiple microservice applications of a request processing architecture. The system includes processor hardware configured to access structured microservice configuration data to identify the microservice applications of the request processing architecture, subscribing to messages transmitted by the identified microservice applications for event monitoring, and receiving multiple messages transmitted by the identified microservice applications. For each of the multiple received messages, the instructions include analyzing one or more fields of the received message to determine a correlation identifier associated with the received message, identifying one of the multiple request data structures, storing an event message entry in the identified request data structure, and transforming a user interface of a user device to display at least a portion of the multiple event message entries.

20 Claims, 11 Drawing Sheets

(58) Field of Classification Search
USPC .......................................................... 718/104
See application file for complete search history.

(56) References Cited

U.S. PATENT DOCUMENTS

| | | | |
|---|---|---|---|
| 10,073,767 B2 | 9/2018 | Gadiya | |
| 10,212,132 B2 | 2/2019 | Ahuja | |
| 10,230,571 B2 | 3/2019 | Rangasamy | |
| 10,412,154 B2 | 9/2019 | Vyas | |
| 10,511,589 B2 | 12/2019 | Gangawane | |
| 10,608,991 B2 | 3/2020 | Ahuja | |
| 10,776,107 B2 | 9/2020 | Mora López | |
| 10,831,649 B2 | 11/2020 | Gadiya | |
| 11,727,016 B1 * | 8/2023 | Agarwal | G06F 16/2428 |
| | | | 707/769 |
| 11,803,438 B2 * | 10/2023 | Muralidharan | G06F 11/0769 |
| 12,020,793 B1 * | 6/2024 | Hopkins | G16H 20/10 |
| 2005/0091196 A1 * | 4/2005 | Day | G06F 16/24542 |
| 2017/0093866 A1 * | 3/2017 | Ben-Noon | H04W 12/068 |
| 2019/0287173 A1 * | 9/2019 | Wadhera | G06Q 40/04 |
| 2020/0112497 A1 * | 4/2020 | Yenumulapalli | H04L 43/10 |
| 2020/0210599 A1 | 7/2020 | Akers | |
| 2021/0218623 A1 * | 7/2021 | Jain | H04L 41/0894 |
| 2022/0103439 A1 * | 3/2022 | Hutton | G06Q 10/0633 |
| 2022/0121628 A1 * | 4/2022 | Devaraj | G06F 16/1824 |
| 2022/0129284 A1 * | 4/2022 | Zhou | G06F 8/71 |
| 2022/0139131 A1 * | 5/2022 | Marcinkowski | H04W 12/04 |
| | | | 340/5.6 |
| 2022/0256011 A1 * | 8/2022 | Cai | H04L 67/61 |

FOREIGN PATENT DOCUMENTS

| | | | | | |
|---|---|---|---|---|---|
| CN | 115438037 A | * | 12/2022 | | |
| CN | 110457143 B | * | 3/2024 | | G06F 9/54 |
| JP | 2021531593 A | * | 2/2022 | | G16H 40/67 |
| KR | 101488663 B1 | * | 2/2015 | | |
| KR | 20220146557 A | * | 11/2022 | | H04W 24/10 |
| WO | WO-2020245835 A1 | * | 12/2020 | | H04L 67/04 |

OTHER PUBLICATIONS

Bach, Distributed Microservices with Event Sourcing and CQRS, https://medium.com/@bacheric/distributed-microservices-with-event-sourcing-and-cqrs-fc11497c4378, Feb. 27, 2020.

Kumar, Mircoservices with CQRS and Event Sourcing, https://dzone.com/articles/microservices-with-cqrs-and-event-sourcing, Feb. 18, 2019.

Pattern: Event Sourcing, https://microservices.io/patterns/data/event-sourcing.html, accessed as early as Jan. 27, 2021.

Warski, Event Sourcing Using Apache Kafka, https://www.confluent.io/blog/event-sourcing-using-apache-kafka/, Mar. 13, 2018.

* cited by examiner

MICROSERVICE ARCHITECTURE WITH AUTOMATED NON-INTRUSIVE EVENT TRACING

FIELD

The present disclosure relates to microservice architectures and more particularly to microservice architectures with automated non-intrusive event tracing.

BACKGROUND

Processing systems for prescription drug fill requests often use multiple applications that may or may not be integrated with one another or collaborate with one another, leading to complex monitoring and lengthy troubleshooting of issues that may occur at any location in the processing system. An individual microservice within the processing system may have a search function to identify elements that are currently being processed by the microservice. However, this requires an administrator to know the exact current microservice location of a prescription drug fill request.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware configured to store structured microservice configuration data, structured event log data, and computer-executable instructions. The structured microservice configuration data includes multiple microservice entries each associated with one of multiple microservice applications of a request processing architecture. The structured event log data includes multiple request data structures each including multiple event message entries associated with a correlation identifier. The system includes processor hardware configured to execute the instructions. The instructions include accessing the structured microservice configuration data to identify the microservice applications of the request processing architecture, subscribing to messages transmitted by the identified microservice applications for event monitoring, and receiving multiple messages transmitted by the identified microservice applications. For each of the multiple received messages, the instructions include, according to the structured microservice configuration data, analyzing one or more fields of the received message to determine a correlation identifier associated with the received message. The instructions include identifying one of the multiple request data structures according to the determined correlation identifier, storing an event message entry in the identified request data structure according to one or more fields of the received message, and transforming a user interface of a user device to display at least a portion of the multiple event message entries.

In other features, the instructions include obtaining message protocol data for each microservice application in the request processing architecture, building a microservice configuration file according to the obtained message protocol data, and storing the microservice configuration file in the structured microservice configuration data. In other features, building the microservice configuration file includes determining an operation sequence of the multiple microservice applications within the request processing architecture, and ordering the multiple microservice entries in the microservice configuration file according to the determined operation sequence.

In other features, building the microservice configuration file includes, for each microservice application in the request processing architecture, identifying fields of a message transmitted by the microservice application, and storing a microservice entry in the microservice configuration file according to the identified fields. In other features, building the microservice configuration file includes, for each microservice application in the request processing architecture, determining whether correlation identifier information is present in a message transmitted by the microservice application, and assigning a retrieval status to a microservice entry in the microservice configuration file in response to determining that correlation identifier information is not present in the message transmitted by the microservice application.

In other features, the instructions further include, for each of the multiple received messages, determining whether the one or more fields of the received message include sensitive data, according to the structured microservice configuration data. The instructions include masking at least a portion of the one or more fields prior to storing the event message entry in the identified request data structure.

In other features, determining the correlation identifier includes determining at least one of a name and a type of the received message, scanning multiple microservice entries of the structured microservice configuration data to identify a match with at least one of the name and type of the received message, and obtaining the correlation identifier according to the matched microservice entry. In other features, the multiple messages transmitted by the identified microservice applications are received via at least one event monitoring application programming interface (API).

In other features, determining the correlation identifier includes determining whether an API retrieval status has been assigned to the received message, according to the structured microservice configuration data, and executing an API call to the microservice application that transmitted the received message to obtain correlation identifier information, in response to determining that an API retrieval status has been assigned to the received message.

In other features, transforming the user interface includes receiving a user input requesting a status associated with a specified one of the multiple request data structures, obtaining a latest one of the multiple event message entries of the specified request data structure, and modifying the user interface to display the microservice application associated with the latest one of the multiple event message entries. In other features, each request data structure is associated with a prescription drug fill request, and the multiple microservice applications include a patient drug coverage confirmation microservice and a pharmacy fill location microservice.

A computerized method for automated non-intrusive event tracing in a microservice architecture includes accessing structured microservice configuration data to identify the microservice applications of a request processing architecture. The structured microservice configuration data includes multiple microservice entries each associated with one of multiple microservice applications of the request processing architecture. The method includes subscribing to messages transmitted by the identified microservice applications for event monitoring, and receiving multiple messages transmitted by the identified microservice applications. For each of the multiple received messages, the method includes, according to the structured microservice configuration data, analyzing one or more fields of the received message to determine a correlation identifier associated with the received message. The method includes, according to the determined correlation identifier, identifying one of multiple request data structures. Each of the multiple request data structures includes multiple event message entries associated with a specific correlation identifier. The method includes, according to one or more fields of the received message, storing an event message entry in the identified request data structure. The method includes transforming a user interface of a user device to display at least a portion of the multiple event message entries.

In other features, the method includes obtaining message protocol data for each microservice application in the request processing architecture, building a microservice configuration file according to the obtained message protocol data, and storing the microservice configuration file in the structured microservice configuration data. In other features, building the microservice configuration file includes determining an operation sequence of the multiple microservice applications within the request processing architecture, and ordering the multiple microservice entries in the microservice configuration file according to the determined operation sequence.

In other features, building the microservice configuration file includes, for each microservice application in the request processing architecture, identifying fields of a message transmitted by the microservice application, and storing a microservice entry in the microservice configuration file according to the identified fields. In other features, building the microservice configuration file includes, for each microservice application in the request processing architecture. I In other features, the method includes determining whether correlation identifier information is present in a message transmitted by the microservice application, and assigning a retrieval status to a microservice entry in the microservice configuration file in response to determining that correlation identifier information is not present in the message transmitted by the microservice application.

In other features, the instructions further include, for each of the multiple received messages determining whether the one or more fields of the received message include sensitive data, according to the structured microservice configuration data. The method includes masking at least a portion of the one or more fields prior to storing the event message entry in the identified request data structure.

In other features, determining the correlation identifier includes determining at least one of a name and a type of the received message, scanning multiple microservice entries of the structured microservice configuration data to identify a match with at least one of the name and type of the received message, and obtaining the correlation identifier according to the matched microservice entry. In other features, the multiple messages transmitted by the identified microservice applications are received via at least one event monitoring application programming interface (API). In other features, determining the correlation identifier includes determining whether an API retrieval status has been assigned to the received message, according to the structured microservice configuration data. In other features, the method includes executing an API call to the microservice application that transmitted the received message to obtain correlation identifier information, in response to determining that an API retrieval status has been assigned to the received message.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-Volume Pharmacy

Figure 1:
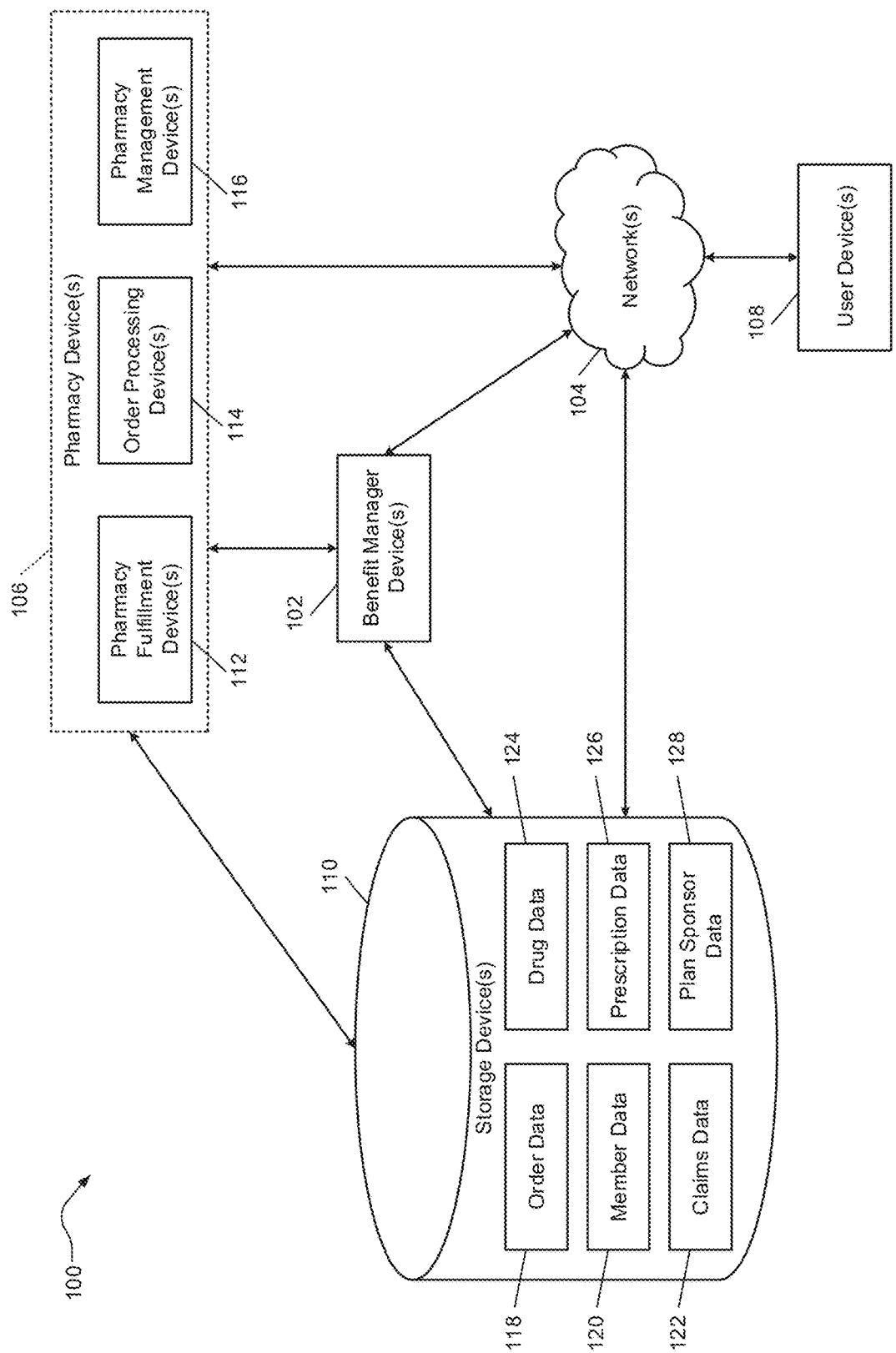
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
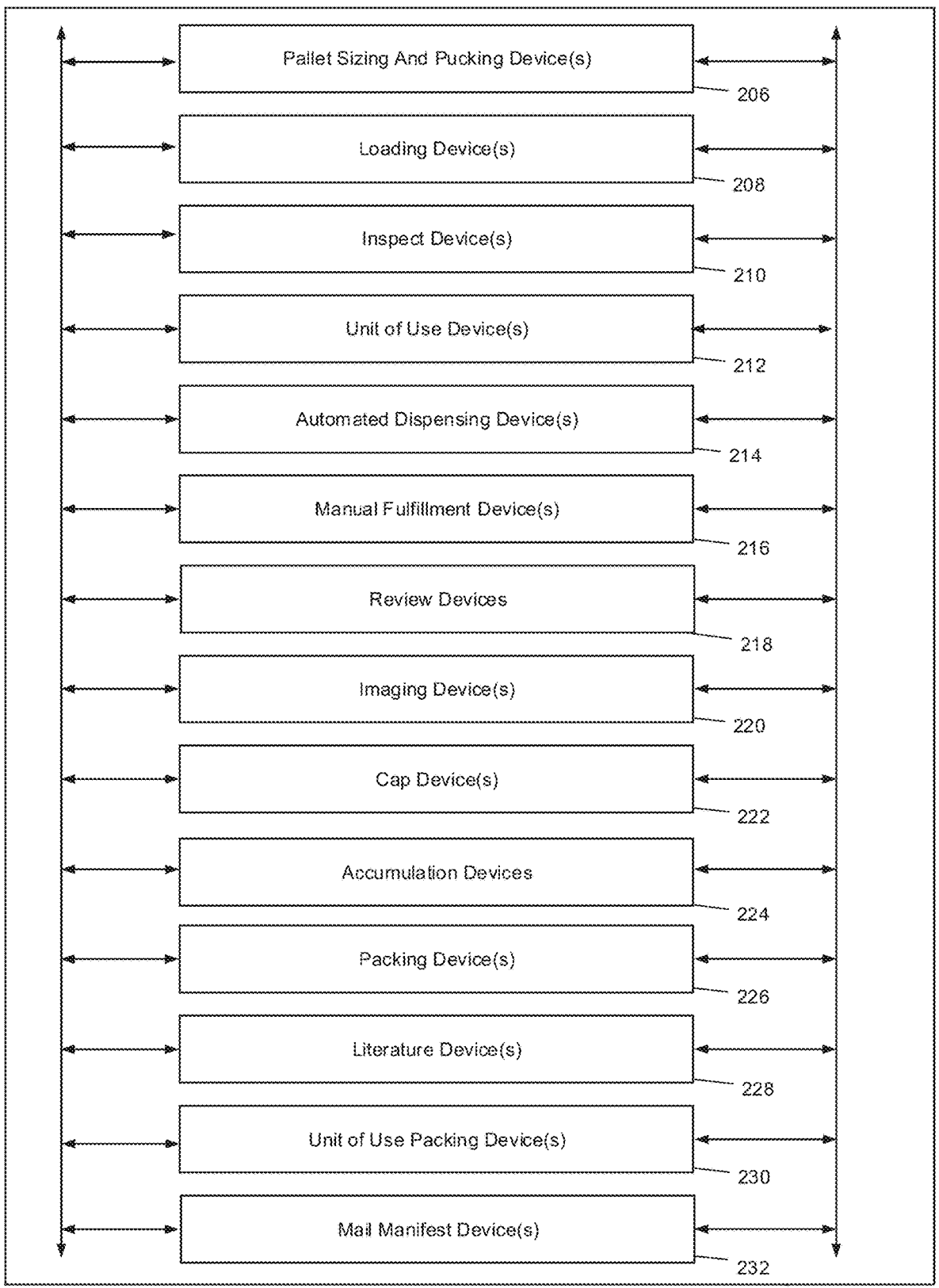
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container.

The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
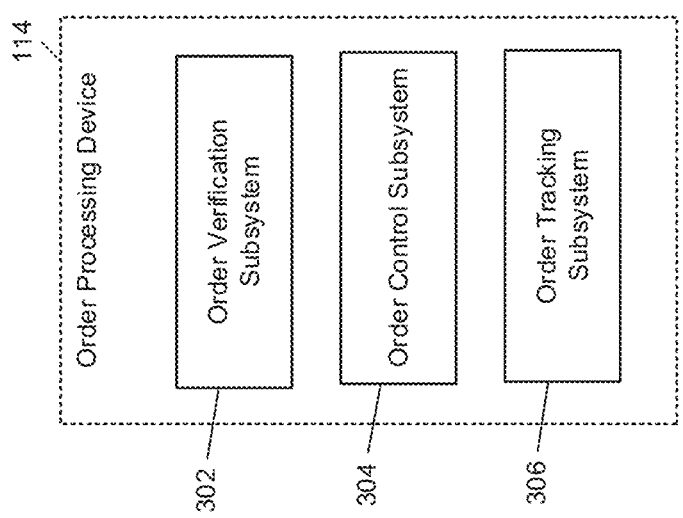
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Automated Non-Intrusive Event Tracing System

Figure 4:
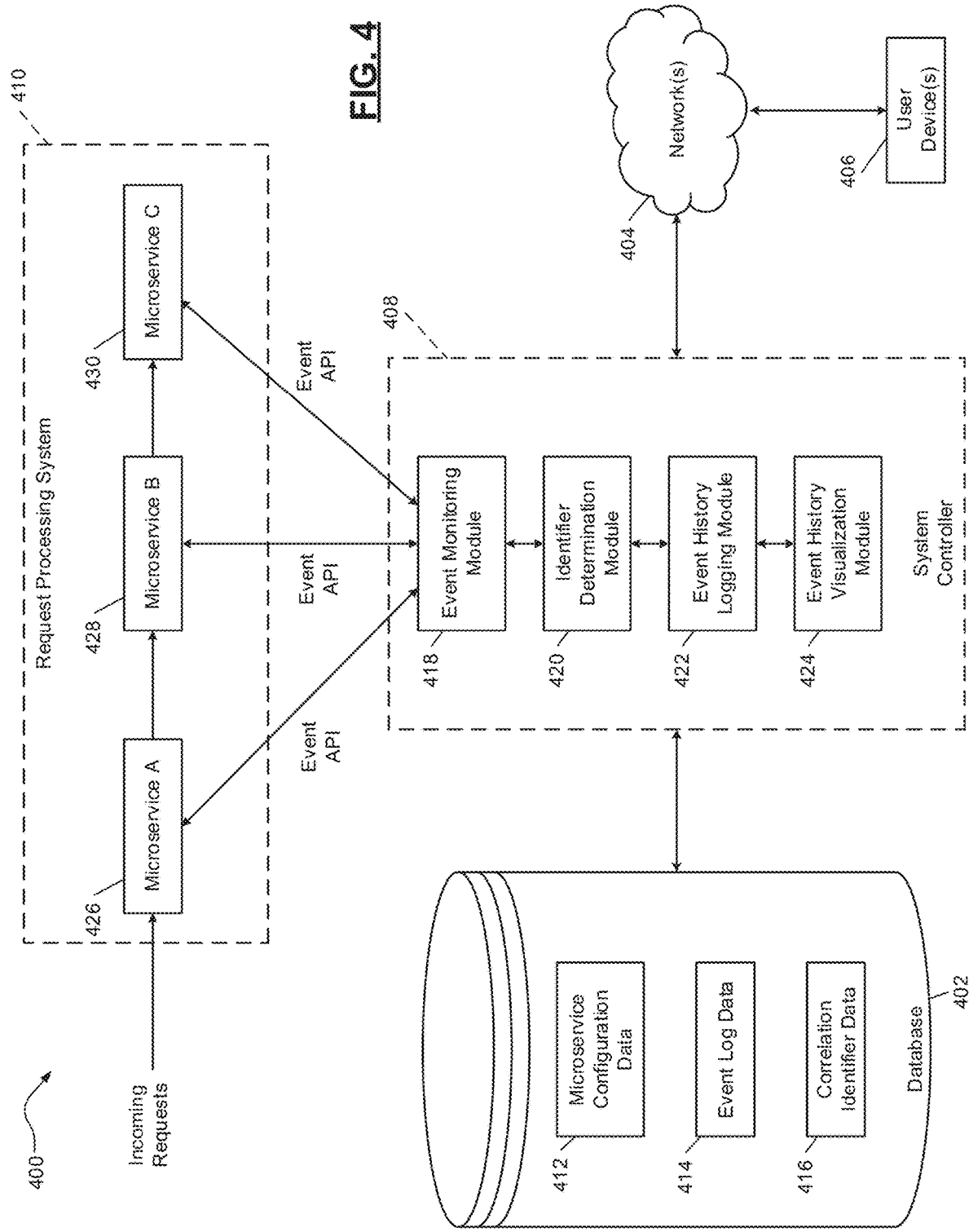
FIG. 4 is a functional block diagram of an example system for automated non-intrusive event tracing in a microservice architecture.

FIG. 4 is a functional block diagram of an example system 400 for automated non-intrusive event tracing in a microservice architecture, where the system 400 includes a database 402. While the system 400 is generally described as being deployed in a computer network system, the database 402 and/or components of the system 400 may otherwise be deployed (for example, as a standalone computer setup). The system 400 may include a desktop computer, a laptop computer, cloud storage and processing, a sever, a tablet, a smartphone, etc.

As shown in FIG. 4, the database 402 stores microservice configuration data 412, event log data 414, and correlation identifier data 416. In various implementations, the database 402 may store other types of data as well. The microservice configuration data 412, event log data 414, and correlation identifier data 416 may be located in different physical memories within the database 402, such as a non-volatile hard disk or flash memory, different instances of databases, different collections, different tables, etc. In some implementations, the microservice configuration data 412, event log data 414, and correlation identifier data 416 may be located in the same memory (such as in different address ranges of the same memory). In various implementations, the microservice configuration data 412, event log data 414, and correlation identifier data 416 may each be stored as structured data in any suitable type of data store.

The microservice configuration data 412 may include any suitable data that describes the configuration of a microservice architecture, such as the request processing system 410. As shown in FIG. 4, the request processing system 410 receives an incoming request (such as a prescription fill request from a patient or prescriber), which is processed by multiple microservices (or microservice applications). In various implementations, a configuration file may use a standard protocol such as JavaScript Object Notation (JSON).

FIG. 4 illustrates a first microservice 426, a second microservice 428, and a third microservice 430. The microservices may transmit the request from one microservice to another, in order to perform various operations on the request. For example, the microservice 426 may verify that all information in a prescription fill request is valid, the microservice 428 may confirm prescription drug coverage for a patient associated with the prescription fill request, and the microservice 430 may assign the prescription fill request to a pharmacy near the patient (or to a mail order pharmacy location) in order to supply the prescription drug to the patient. In various implementations, other suitable operations may be performed by microservice applications, such as document intake, transfer of fill requests, patient membership validation, prescription drug confirmation, claim processing, and so on.

The microservices 426, 428 and 430 may communicate via messages (which may be referred to as events) to alert one another when a microservice has performed its processing operation(s) on a prescription fill request. In various implementations, there may be a specified sequential flow between the microservices 426, 428 and 430, or one or more microservices may operate independently, simultaneously, asynchronously, and so on, with respect to other microservices.

In various implementations, the system 400 may handle forks and joins in a flow of requests, events, etc., through the microservice architecture. For example, a JavaScript Object Notation (JSON) format may be used for a configuration file that describes forks and joins in the microservice architecture flow, in order to maintain a correlation identifier throughout the flow without requiring changes to existing microservice communications. Although FIG. 4 illustrates three microservices 426, 428 and 430 operating in a sequential order, other architectures may include more or less microservices, microservices that operate in a different arrangement with respect to one another, other applications that may not be considered as microservices, and so on. The microservice configuration data 412 may store information about the arrangement and communication between the microservices 426, 428 and 430.

In various implementations, messages may be transmitted between microservices using any suitable communication protocol, such as a publish-sub scribe based system like Apache Kafka. Various application programming interfaces (APIs) may be used for communication, such as a representational state transfer (REST) API. In various implementations, communications within the microservice architecture may include events, where the events are publisher-subscriber based, such as a publisher communicating a change in its own state and a publisher commanding one or more subscribers to take an action.

The event log data 414 may include logs of events, which may be related to incoming requests and may include key information regarding actions performed on the requests by the microservices 426, 428 and 430. For example, the event log data 414 may include information for each message transmitted between the microservices 426, 428 and 430, to identify requests that have been processed by the microservices 426, 428 and 430. In various implementations, a request may be inherently synchronous, where events/messages are inherently asynchronous. The system 400 may be focused on asynchronous communications, while accommodating synchronous communications with Hypertext Transfer Protocol (HTTP) requests.

The correlation identifier data 416 may store information for correlating messages/events from the microservices 426, 428 and 430 to specific incoming requests. For example, different messages from the microservices 426, 428 and 430 may use different protocols and contain different information, so the correlation identifier data 416 may facilitate analysis of the different messages to identify a specific prescription fill request corresponding to the message. In various implementations, the correlation identifier data 416 may be based on the structure of the request processing system as identified in the microservice configuration data 412, a publisher's relationship with its upstream systems, etc.

As shown in FIG. 4, a system controller 408 interfaces between the database 402 and the request processing system 410. The system controller 408 may include one or more modules for automated processing of events from the request processing system 410. For example, FIG. 4 illustrates an event monitoring module 418, an identifier determination module 420, an event history logging module 422, and an event history visualization module 424.

The event monitoring module 418 may monitor for events in the request processing system 410 via event application programming interfaces (APIs). For example, the event monitoring module 418 may determine a structure of the microservices 426, 428 and 430 within the request processing system 410 based on the microservice configuration data 412, and subscribe to messages transmitted between the microservices via APIs. In various implementations, the event monitoring module 418 may use any other suitable approaches for monitoring events within the request processing system 410.

The identifier determination module 420 may use the correlation identifier data 416 to identify an upstream event that the currently received message/event should be correlated with (such as a specific prescription fill request associated with each message/event received by the event monitoring module 418). For example, and as described further below, the identifier determination module 420 may analyze a protocol or other type information of a message to determine which upstream event is correlated with the currently received message/event (such as which prescription fill request was processed to generate the message).

The event history logging module 422 may store identified events and correlation identifier information in the database 402, such as in the event log data 414. For example, once a message has been obtained by the event monitoring module 418 and associated with a specific prescription fill request, details of the message may be stored in the event log data 414 in association with the prescription fill request. This may facilitate tracking or searching of a current location of a prescription fill request within the request processing system 410 (such as a determination of which microservice is currently processing the request or which microservice last handled the request).

In various implementations, the system 400 may use a non-intrusive event sourcing pattern. For example, the system 400 may persist the state of an entity (such as a prescription fill request) as a sequence of state-changing events. Whenever the state of an entity changes, a new event is appended to the list of events. Because saving an event is a single operation, it is inherently atomic. An application may reconstruct an entity's current state by replaying the events. Applications may persist events in an event store, which is a database of events. The event store may include APIs for adding and retrieving an entity's events, and may operate as a message broker. The event store may provide an API that enables services to subscribe to events, where when a service saves an event in the event store, the event is delivered to all interested subscribers.

Some entities, such as a prescription fill request, may have a large number of events. In order to optimize loading, an application may periodically save a snapshot of an entity's current state. In order to reconstruct the current state, the application may find the most recent snapshot and the events that have occurred since that snapshot, resulting in fewer events to replay. In various implementations, the system 400 may use a non-intrusive event sourcing pattern using example methods and components described herein.

The event history visualization module 424 may display information about the system 400 to a user, such as a current location within the request processing system 410 of a specific prescription fill request. As described further below, the event history visualization module 424 may display information about the processing performed by each microservice individually, in order to determine whether any bottlenecks are occurring between the microservices of the request processing system 410. In various implementations, the event history visualization module 424 may display a time taken between a previous step/system in a microservice architecture flow and a next step/system in the flow.

In various implementations, the event history visualization module 424 may access the event log data 414 to determine information to display to a user, such as a system administrator, via a user device 406. The user device 406 may include any suitable user device for displaying text and receiving input from a user, including a desktop computer, a laptop computer, a tablet, a smartphone, etc. In various implementations, the user device 406 may access the database 402 or the system controller 408 directly, or may access the database 402 or the system controller 408 through one or more networks 404. Example networks may include a wireless network, a local area network (LAN), the Internet, a cellular network, etc.

In various implementations, the system 400 may facilitate monitoring of prescription drug fill requests, doctor referrals, or other suitable documentation, as they move through microservice applications of the system 400. For example, if a doctor or patient calls to check on the status of a submitted request, the system 400 may allow for determination of a current or latest microservice application that is processing the submitted request. The system 400 may provide end to end visibility, to determine whether a request was dropped, has been held up, and so on.

The system 400 may monitor the status of different requests via event message communications between different microservice applications, without requiring modification to the microservice applications to use a standard identifier or protocol. For example, modifying microservice applications of existing systems to use standard identifiers/protocols across all microservices would be very complex, time-consuming, prone to errors, or even infeasible. In various implementations, the system 400 may provide a unique advantage of monitoring events for a common entity without requiring modification to the microservice applications themselves. For example, the system 400 may determine an identifier (which may be referred to as a correlation ID), by analyzing a normal communication message transmitted by a microservice application. As mentioned above, the system 400 may use a structure such as JSON to handle forks and joins as different events occur while a request flows through different microservice applications. In various implementations, the system 400 may provide adaptability and observability for the events and communications between microservice applications, such as Kafka messages and other message types.

Figure 5A:
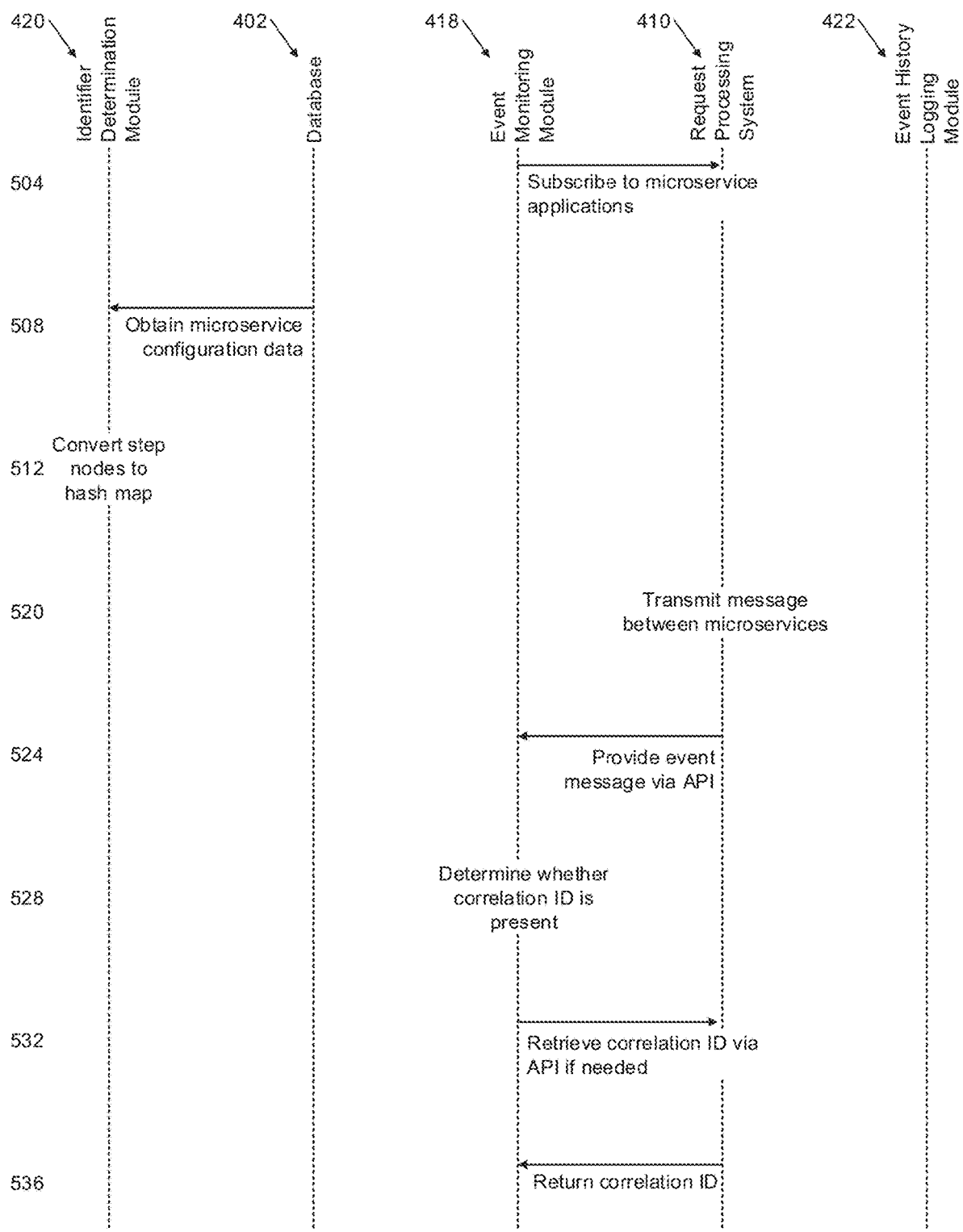
FIGS. 5A and 5B are message sequence charts illustrating example interactions between the components of the system of FIG. 4.
Figure 5B:
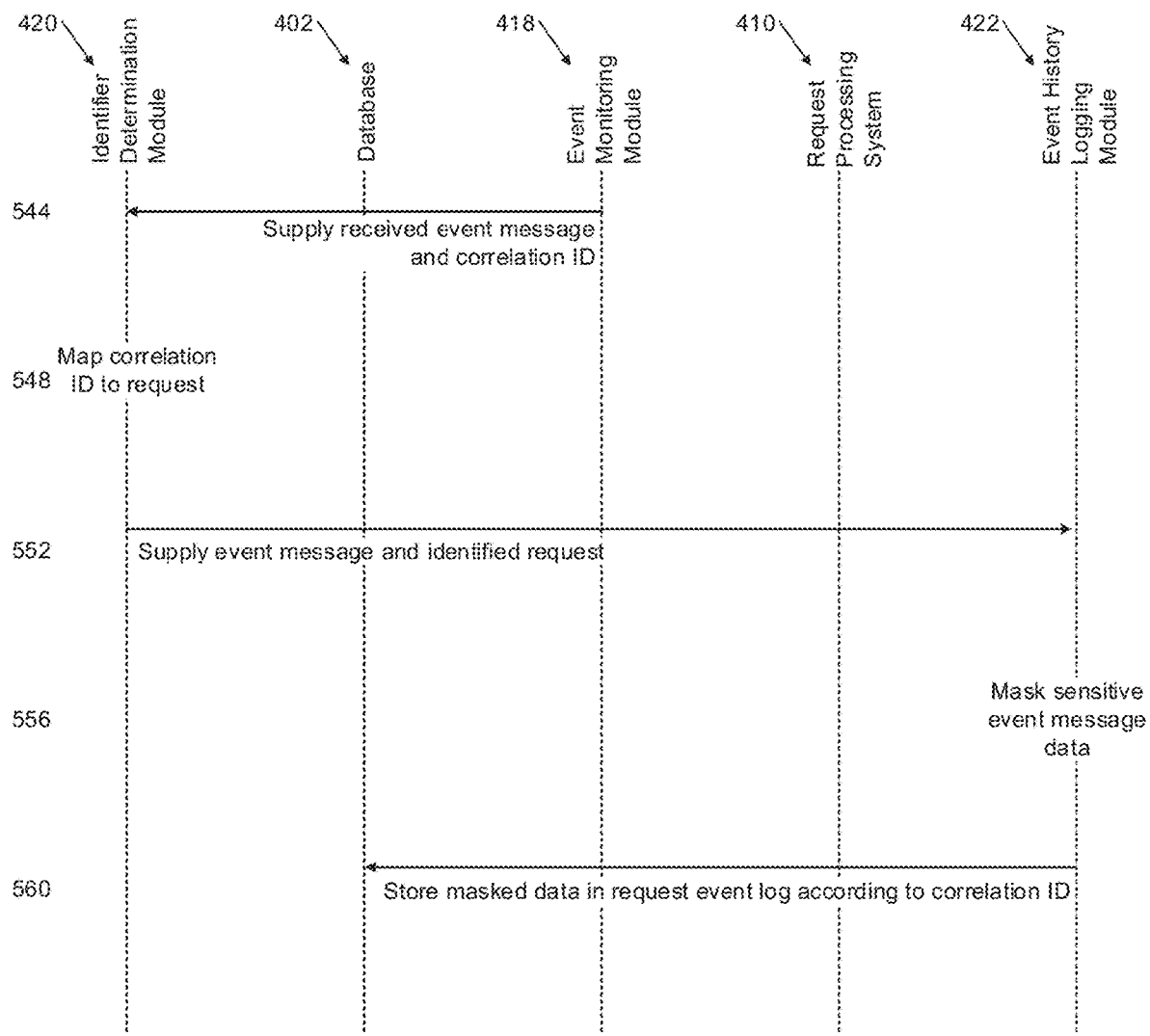

FIGS. 5A and 5B are message sequence charts illustrating example interactions between the identifier determination module 420, the database 402, the event monitoring module 418, the request processing system 410, and the event history logging module 422. At line 504, the event monitoring module 418 subscribes to microservice applications of the request processing system 410. For example, a publisher-subscriber implementation may be used to allow the event monitoring module 418 to subscribe to event messages published by microservice applications (such as via one or more event APIs).

At line 508, the identifier determination module 420 obtains microservice configuration data from the database 402 (or any suitable location that stores data describing a configuration of microservice applications), such as the microservice configuration data 412. In various implementations, the microservice configuration data may be generated by a system administrator according to details of event flows between different microservice applications in the request processing system 410, which may include one or more forks or joins as described herein.

At line 512, the identifier determination module 420 converts step nodes of the microservice configuration data to a hash map. For example, the microservice configuration data may specify a flow of messages between different microservice applications within the request processing system 410. In various implementations, each step within the flow may be converted to a hash map, so the identifier determination module 420 can determine which messages correspond to which steps in a typical flow path for a prescription fill request as it proceeds through the request processing system 410.

At line 520, the request processing system 410 transmits a message between microservices of the request processing system 410, such as when one of the microservices 426, 428 or 430 has completed its operation(s) on a prescription fill request. The message is provided from the request processing system 410 to the event monitoring module 418 via an API at line 524, although in various implementations other event monitoring techniques may be used.

The event monitoring module 418 then determines whether a correlation identifier (ID) is present in the event message, at line 528. For example, different message protocols used by various microservices may or may not include information that specifies a correlation ID which identifies a specific prescription fill request. The event monitoring module 418 may determine whether a message type of the received event message requires additional searching in order to identify the correlation ID associated with the event message.

At line 532, the event monitoring module 418 retrieves the correlation ID from the request processing system 410 via an API (or from another system that manages/maintains the data), if the correlation ID was not able to be determined based on only the data in the received event message. In various implementations, the event monitoring module 418 may request information from the microservice of the request processing system 410 that transmitted the received event message, so the microservice can provide additional information to determine the correlation ID corresponding to the prescription fill request associated with the event message. The request processing system 410 then returns the correlation ID (or additional information for determining the correlation ID) at line 536. For example, the request processing system 410 may return an identifier to a predecessor system/entry, where the correlation ID is obtained from the predecessor system/entry using the identifier determination module 420.

Referring now to FIG. 5B, at line 544 the event monitoring module 418 supplies the received event message and the determined correlation ID to the identifier determination module 420. The identifier determination module 420 then maps the correlation ID to a specific prescription fill request at line 548. For example, a unique correlation ID may be associated with each prescription fill request received by the request processing system 410, such that the identifier determination module 420 can access a specific prescription fill request based on the correlation ID provided by the event monitoring module 418.

At line 552, the identifier determination module 420 supplies the event message to the event history logging module 422, along with the identified prescription fill request and/or the determined correlation ID associated with the event message. The event history logging module 422 then masks sensitive event message data at line 556. For example, a prescription fill request message transmitted between microservices of the request processing system 410 may include sensitive health data, such as personal health information (PHI), which should be masked according to privacy guidelines or regulations. In various implementations, the system 400 may provide configurable masking. For example, an administrator may to configure which portions of event data are masked prior to logging the event, and the configured portions may be varied for different types of events.

If the event history logging module 422 determines that the message received from one of the microservices includes sensitive data, the event history logging module 422 masks sensitive data according to any suitable health information masking protocols. The event history logging module 422 then stores the masked data in the event log data 416 of the database 402 at line 560, according to the determined correlation ID.

Micro Service Event Monitoring Process

Figure 6:
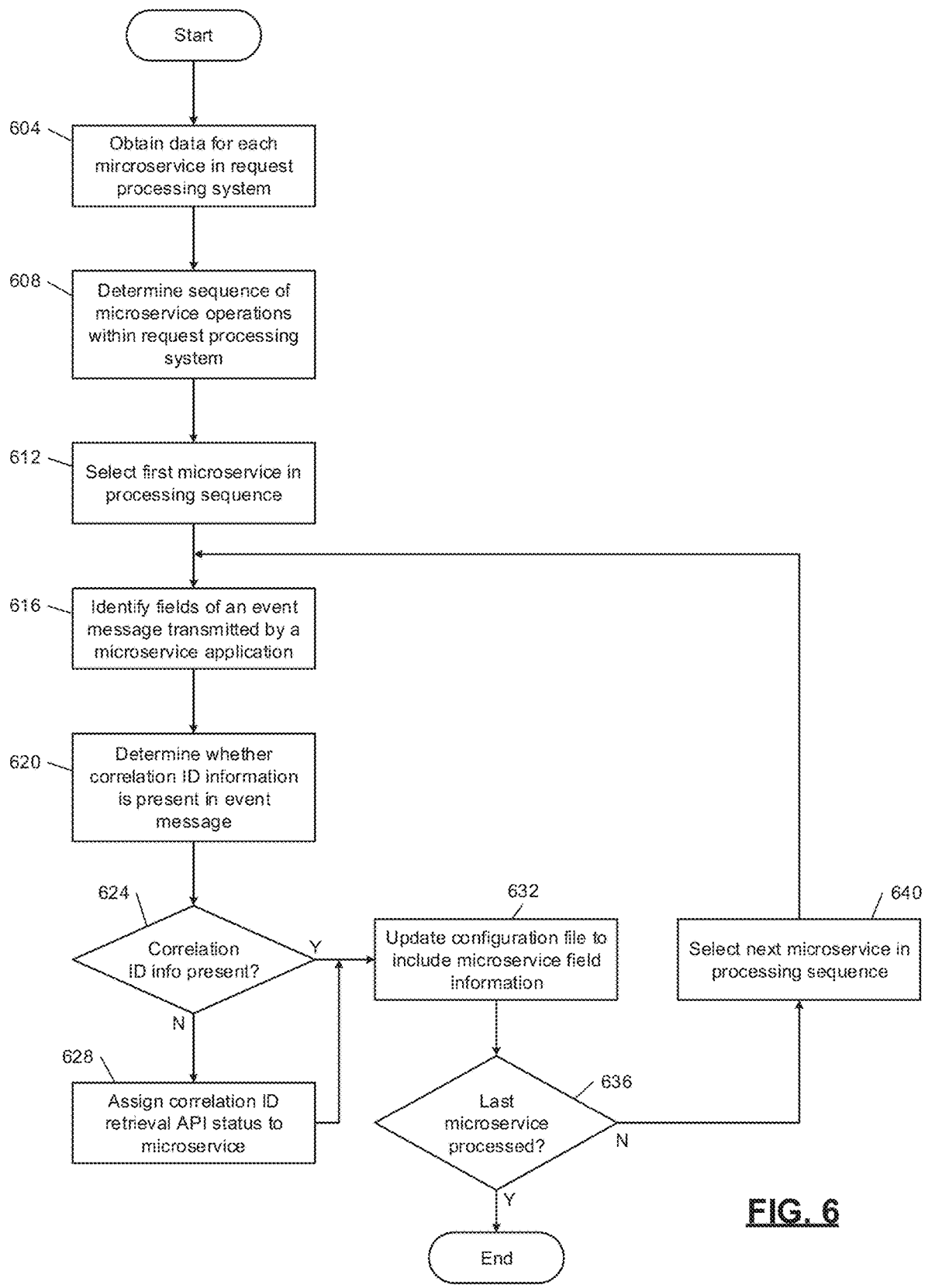
FIG. 6 is a flowchart depicting an example process for building a configuration file to automatically process events in a microservice architecture.

FIG. 6 is a flowchart depicting an example process for building a configuration file to automatically process events in a microservice architecture, which may be performed by, for example, the system controller 408. Control begins at 604 by obtaining data for each microservice in a request processing system, such as the microservices 426, 428 and 430 of the request processing system 410 of FIG. 4.

At 608, control determines a sequence of microservice operations within the request processing system. For example, the determined sequence may represent a typical flow path of a prescription fill request through the microservices as they perform their respective operations on the fill request to get a prescription drug fill completed. At line 612, control selects the first microservice in the processing sequence.

Control identifies fields of the event message transmitted by a microservice application at 616. At 620, control determines whether correlation ID information is present in the transmitted event message. If correlation ID info is present in the event message at 624, control proceeds to update a configuration file to include microservice field information at 632. For example, control may add information about a protocol of the event message for the microservice to the configuration file, add details of fields included in the event message, and so on.

If control determines that correlation ID information is not present in the received event message at 624, control assigns a correlation ID retrieval API status to the microservice at 628. For example, when building the configuration file, control may specify that messages from a particular microservice require an API call to the microservice that transmitted the message in order to obtain additional information from the microservice for identifying which prescription fill request was processed by the microservice.

Control then proceeds to 632 to update the configuration file to include microservice field information. For example, the updated configuration file may store details about the information provided by the microservice in response to the correlation ID retrieval API call, such as fields included in the response transmitted by the microservice.

At 636, control determines whether the last microservice in the sequence or system has been processed. If not, control proceeds to 640 to select a next microservice in the sequence, and then identifies fields of the event message transmitted by the microservice application at 616. Once control determines at 636 that all microservices in the system have been added to the configuration file, the process of FIG. 6 ends.

In various implementations, the steps and flows of the configuration may be easily modified if microservice components are added or removed from the request processing system 410. An entry in the configuration file may be added or removed to correspond to changes to microservice components in the request processing system 410, without requiring changes to the entire monitoring process. For example, the event monitoring module 418 may simply use an updated configuration file from the microservice configuration data 412 to monitor messages in an updated architecture of the request processing system 410.

Figure 7:
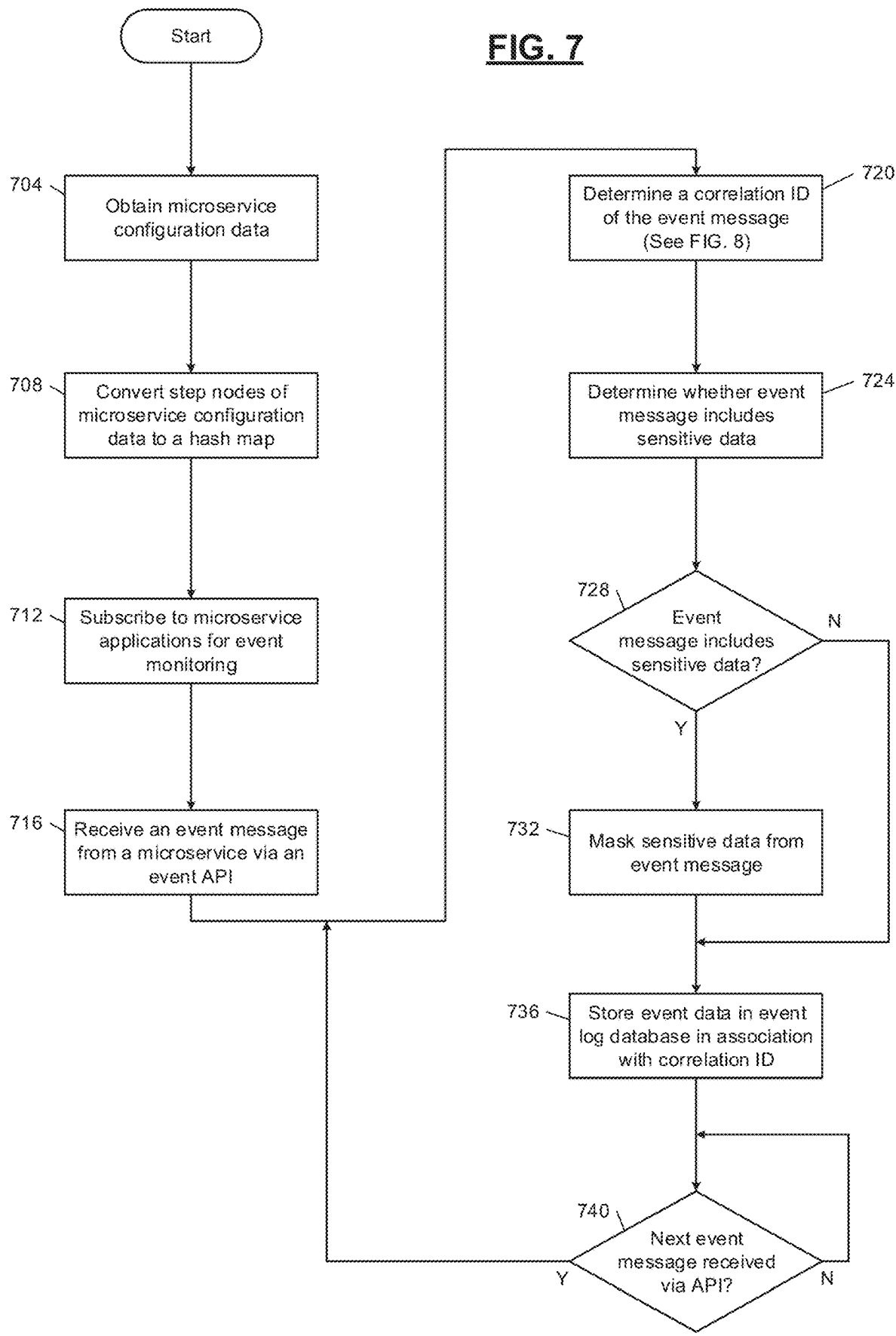
FIG. 7 is a flowchart depicting an example process for automated non-intrusive event tracing in a microservice architecture.

FIG. 7 is a flowchart depicting an example process for automated processing of events in a microservice architecture. Control begins at 704 by obtaining microservice configuration data, such as the microservice configuration data 412 of the database 402 of FIG. 4.

At 708, control converts step nodes of the microservice configuration data to a hash map. Example code for steps of the microservice configuration file is provided below where a first microservice is named "RTM" with a type of "Kafka", a second microservice is named "IngestionDocumentAPI" with a type of "event", a third microservice is named "RxHomeEventAdaptor" with a type of "event", and so on.

```
"steps" : [
  {
    "name" : "RTM",
    "type" : "kafka",
    "topicName" :
```

```
["TP.SPECIALTY.RTM.REFILL.TRANSFER.REQUEST"],
    "key":"sourceItems.communicationId",
    "correlationId":"sourceItems.communicationId"
},
{
    "name" : "IngestionDocumentAPI",
    "type" : "event",
    "eventNames" :[{"name":"v1-ingestions-doc.open-refill-transfer"}],
    "key":"resourceId",
    "retrieveAPIInfo": {
        "getUrl":"https://qa-ingestionapi.apps.ch3pcf01.express-scripts.com/ingestionDocument/",
        "responseType":"XML",
        "fetchField":"SourceItems.communicationId"
    }
},
{
    "name" : "RxHomeEventAdaptor",
    "type" : "event",
    "eventNames" : [{"name":"specialty-rx-home.open-refill-transfer-indexed"}],
    "key":"ingestionGUID",
},
{
    "name" : "Clearance",
    "type" : "event",
    "eventNames" : [{"name":"specialty-membership.benefit-created"}],
    "key":"uuid",
},
{
    "name" : "PrescriptionAPIV1",
    "type" : "event",
    "eventNames" :[{"name":"specialty-v1-prescription.open-refill-transfer-file-prescription-creation-success"},
    {"name":"specialty-v1-prescription.regulatory-rule-validation-failure"}],
    "key":"prescriptionGUID",
    "retrieveAPIInfo": {
        "getUrl":"https://api-qa.express-scripts.io/v1/prescriptions?",
        "responseType":"JSONArray",
        "fetchField":"prescription.ingestionGUID",
        "queryParam":"rxGUID"
    }
},
{
    "name" : "PrescriptionAPIV1_Failure",
    "type" : "event",
    "eventNames" : [{"name":"specialty-v1-prescription.open-refill-transfer-file-prescription-creation-failure"}],
    "key":"ingestionGUID",
},
{
    "name" : "RXPOrderEntry",
    "type" : "event",
    "eventNames" : [{"name":"specialty-rxp.order-entry-complete"},
    {"name":"specialty-rxp.order-entry-exception"}],
    "key":"IngestionGUID",
}
]
```

In the example above, the "topicName" may specify a location for accessing event messages from the microservice, the "key" may specify a specific field for accessing a correlation ID associated with the message, and the "correlationId" may specify a location of a value of the correlation ID. The "retrieveAPIInfo" fields may specify locations for a specific API call if correlation ID information is not present in the received event message from a microservice.

Control then subscribes to microservice applications or messages transmitted by microservice applications at 712, to monitor events in the request processing system. In various implementations, microservice application messages may be subscribed to via an event API, or any other suitable monitoring technique.

At 716, control receives an event message transmitted by a microservice via an event API. Control then proceeds to 720 to determine a correlation ID of the received event message. An example process for determining a correlation ID associated with a message transmitted by a microservice is described further below with reference to FIG. 8.

Control determines whether the message received via the event API includes sensitive data (such as protected health information) at 724. If control determines that the message includes sensitive data at 728, control masks the sensitive data at 732. The masking may include any suitable protocol for protecting sensitive data prior to storing the data in a database.

After masking the sensitive data at 732, or if control determines at 728 that the message received via the event API does not include sensitive data, control stores event data in an event log in association with a correlation ID corresponding to the message, at 736. The correlation ID may identify a specific prescription fill request that was processed by the microservice prior to, or in association with, sending the event message that was monitored via the event API.

In various implementations, the data may be stored using a similar format for each correlation ID entry. For example, the event log data 414 may include all messages that are associated with each correlation ID entry, where the log data storage fields for each event message are the same even though the approach to obtaining the data was different. Control then proceeds to 740. At 740, once a next event message is received from the microservice API, control returns to 720 to determine a correlation ID of the next event message.

Automated Event Correlation Identification

Figure 8:
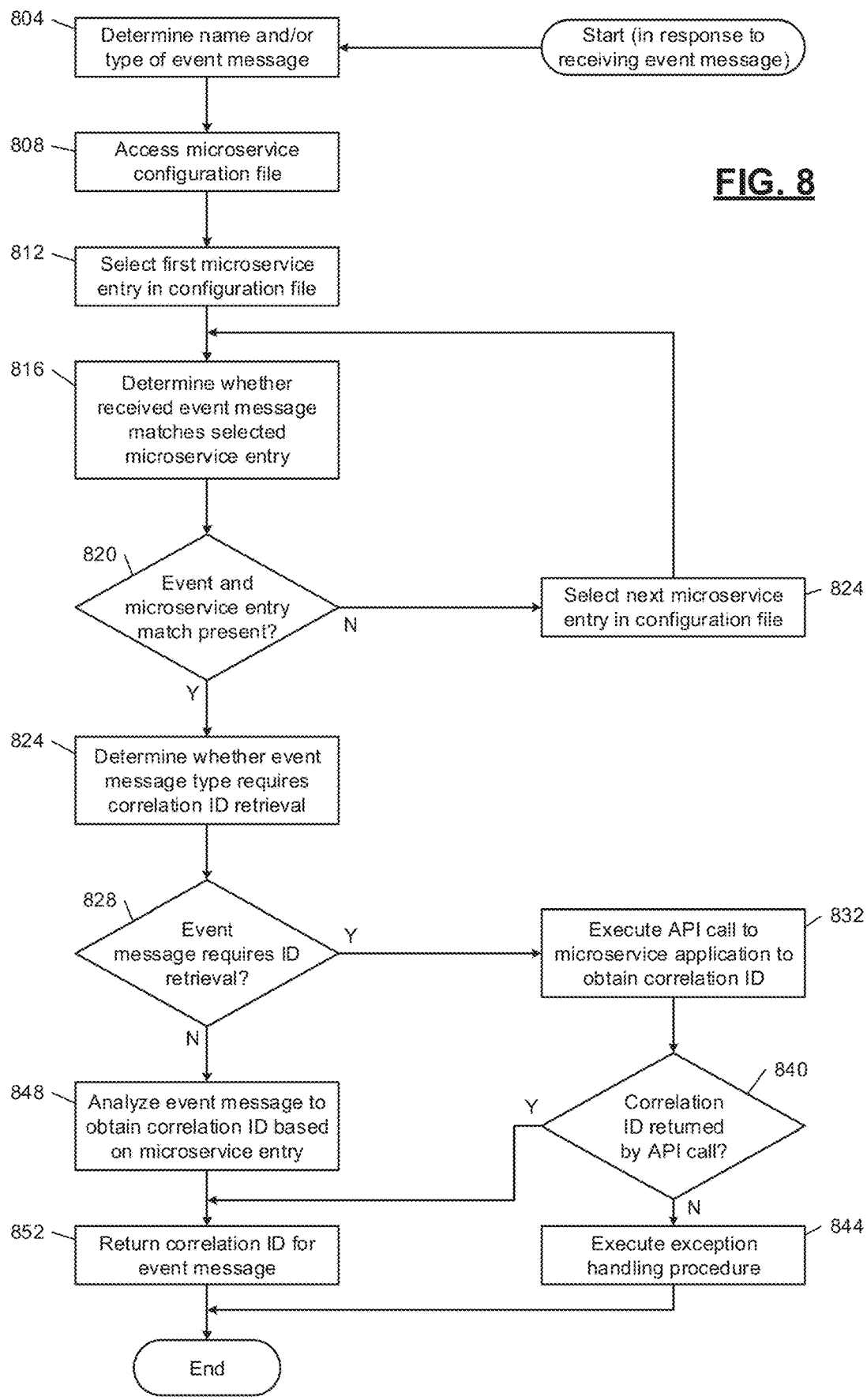
FIG. 8 is a flowchart depicting an example process for determining a correlation identifier associated with a microservice event.

FIG. 8 is a flowchart depicting an example process for determining a correlation identifier associated with a microservice event. Control begins in response to receiving an event message, by determining a name and/or type of the message at 804. For example, different messages transmitted by different microservices may use different protocols, have different fields, and so on. Control then accesses a microservice configuration file, such as from the microservice configuration data 412 of FIG. 4, at 808.

At 812, control selects the first microservice entry in the configuration file. Control then determines whether the received event message matches the selected microservice entry at 816. If control determines at 820 that the received event message does not match the selected entry in the microservice configuration file, control proceeds to 824 to select the next microservice entry in the configuration file, and returns to 816 to determine whether the received event message matches the next microservice entry in the configuration file.

Below is example code for a flow of checking microservice entries in a configuration file. In this example, control may first check whether the received event message matches the "RTM" entry in the configuration file, and then check whether the event message matches the "IngestionDocumentAPI" entry in the configuration file, and so on. As mentioned above, the entries in the flow code and in the steps code that define at least portions of the configuration file may list the entries in a sequence that corresponds to a typical sequence of microservices in an architecture for processing a prescription fill request.

```
"flows" : [
  {
    "flowName" : "ortf",
    "origin" : "RTM",
    "nextSteps" : [
      {
        "name" :"IngestionDocumentAPI",
        "nextSteps" : [
          {
            "name" :"RxHomeEventAdaptor"
            "nextSteps": [
              {
                "name" : "PrescriptionAPI",
                "nextSteps" : [
                  {
                    "name": "RXPOrderEntry",
                    "join": [
                      {
                        "joinName":"Clearance"
                      }
                    ]
                  }
                ]
              }
            ]
          },
          {
```

-continued

```
            "name":"Clearance"
          }
        ]
      }
    ]
  }
]
}
```

If control determines at 820 that the received event message matches an entry in the microservice entry configuration file, control proceeds to 824 to determine whether a type of the event message requires a correlation ID retrieval. If the event message does not require an additional correlation ID retrieval operation (such as another API call to the microservice that transmitted the event message), control analyzes the received event message at 848 based on the microservice entry in the configuration file to determine a correlation ID which identifies a specific prescription fill request associated with the event message. Control then returns the determined correlation ID for the event message at 852.

If control determines at 828 that the received event message requires an additional correlation ID information retrieval operation, control proceeds to 832 to execute an API call to the microservice application that transmitted the event message in order to obtain additional information for determining a correlation ID associated with the message. Control then determines at 840 whether information for determining a correlation ID was validly returned by the API call. If so, control proceeds to 852 to return a determined correlation ID for the event message.

At 840, when control determines that the correlation ID was not returned by API the call, control proceeds to 844 to execute exception handling procedure. For example, if the request processing system has handled a prescription fill request in a different microservice order than expected, the API call to the microservice may not return information sufficient to determine a correlation ID associated with the event message. In various implementations, the exception handling procedure at 844 may include submitting the prescription fill request for manual review, or other automated processes for determining a correlation ID associated with the message which corresponds to a specific prescription fill request.

Figure 9:
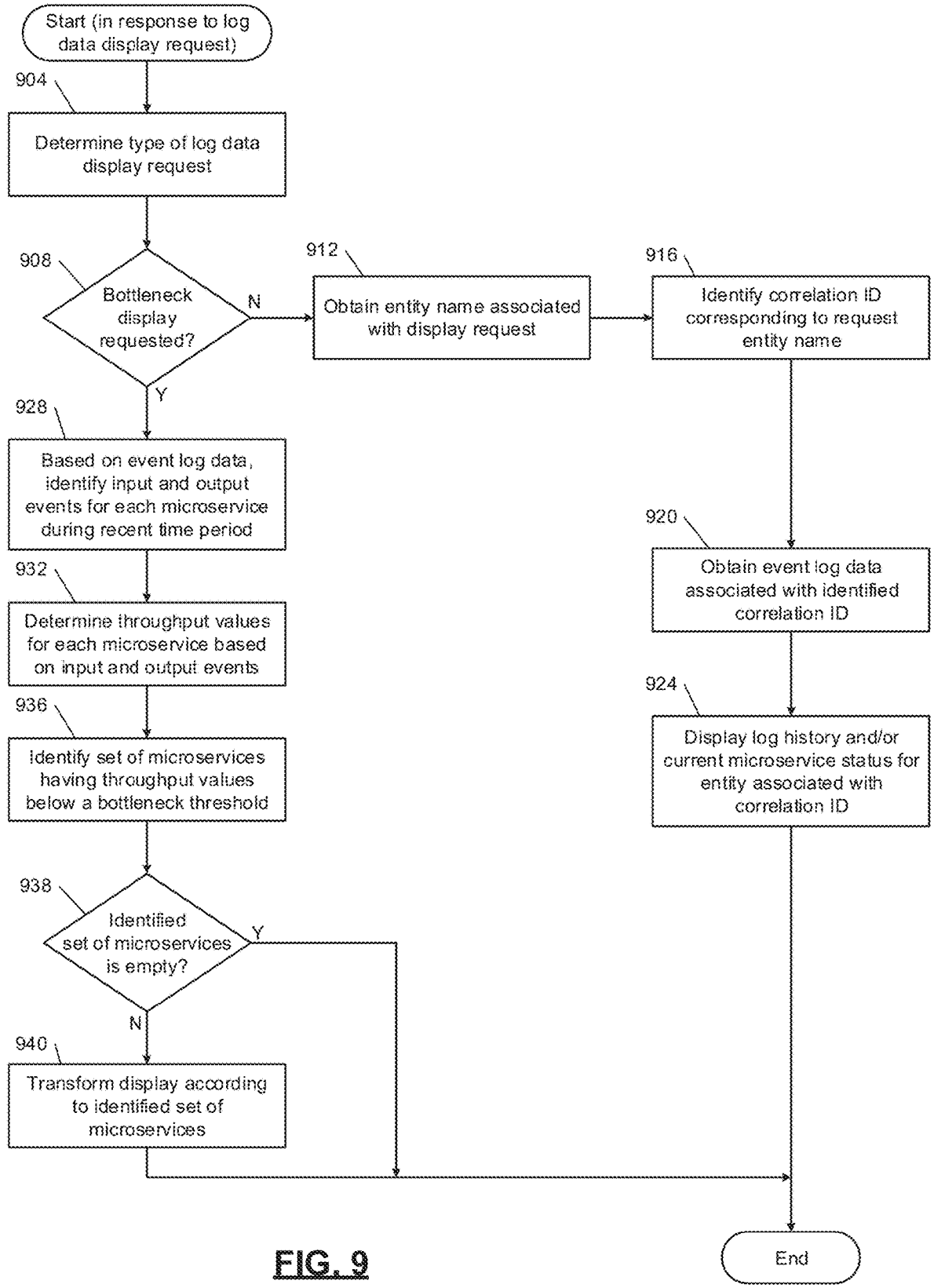
FIG. 9 is a flowchart depicting an example process for displaying log data associated with one or more microservice events.

FIG. 9 is a flowchart depicting an example process for displaying log data associated with one or more microservice events. Control begins in response to a log data display request (such as a request from a user to view event status information), by determining the type of the log data display request at 904. For example, the user may request different views of different event data, such as a location of a specific prescription fill request within the request processing system 410 at the current time period. As another example, a user may request to view throughput information for each microservice, in order to identify bottlenecks within the prescription fill request automated processing system. In various implementations, end of life occurrences may be tracked (such as when an event is terminated at a microservice, or transferred to an outside system, etc.), for view by a system administrator.

At 908, control determines whether a bottleneck display has been requested. If not, control obtains an entity name associated with the display request at 912. At 916, control identifies a correlation ID corresponding to the request entity name. For example, a user may submit a name associated with a prescription fill request (such as a patient name), and control determines a correlation ID corresponding to the prescription fill request that the user wishes to view.

Control obtains event log information associated with the identified correlation ID at 920. For example, control may obtain a list of events corresponding to the correlation ID from the correlation identifier data 416 of the database 402 illustrated in FIG. 4. Control then displays the log history and a current microservice status for prescription fill request associated with the correlation ID, at 924. For example, control may identify the latest event log entry for the prescription fill request and display the latest event status to the user, so the user can determine where the prescription fill request stands currently in the request processing system.

If control determines at 908 that a bottleneck display has been requested, control proceeds to 928 to identify input and output events for each microservice during a recent time period (such as the last hour, the last day, or the last week), based on event log data. Control then determines throughput values for each microservice based on the input and output events in 932. For example, control may determine that one microservice has processed twenty prescription fill requests in the last hour, while another microservice has processed only two requests and has eighteen more requests currently waiting at the input side of the microservice.

At 936, control identifies a set of microservices having throughput values below a bottleneck threshold (such as less than fifty percent of an average microservice throughput rate, less than ten prescription fill requests processed in an hour, or a threshold specified by a user). At 938, control determines whether the set of microservices is the empty set. If so, control ends; otherwise, control transfers to 940. At 940, control transforms the display based on the set of microservices. For example, some or all of the set of microservices may be displayed in a list user interface element. As another example, ones of the set of microservices may be visually highlighted (such as with bolded text or a thick, colored outline) within a user interface element, such as a list.

Additionally or alternatively, other actions (not shown in FIG. 9) may be taken based on the set of microservices. For example, if a throughput value for one microservice is less than 50% of an average throughput for other microservices, control may determine that a bottleneck has occurred at the identified microservice, and alert a technician to address the bottlenecked microservice. The alert may take the form of a popup, an electronic message, an entry in a service queue, etc.

Figure 10:
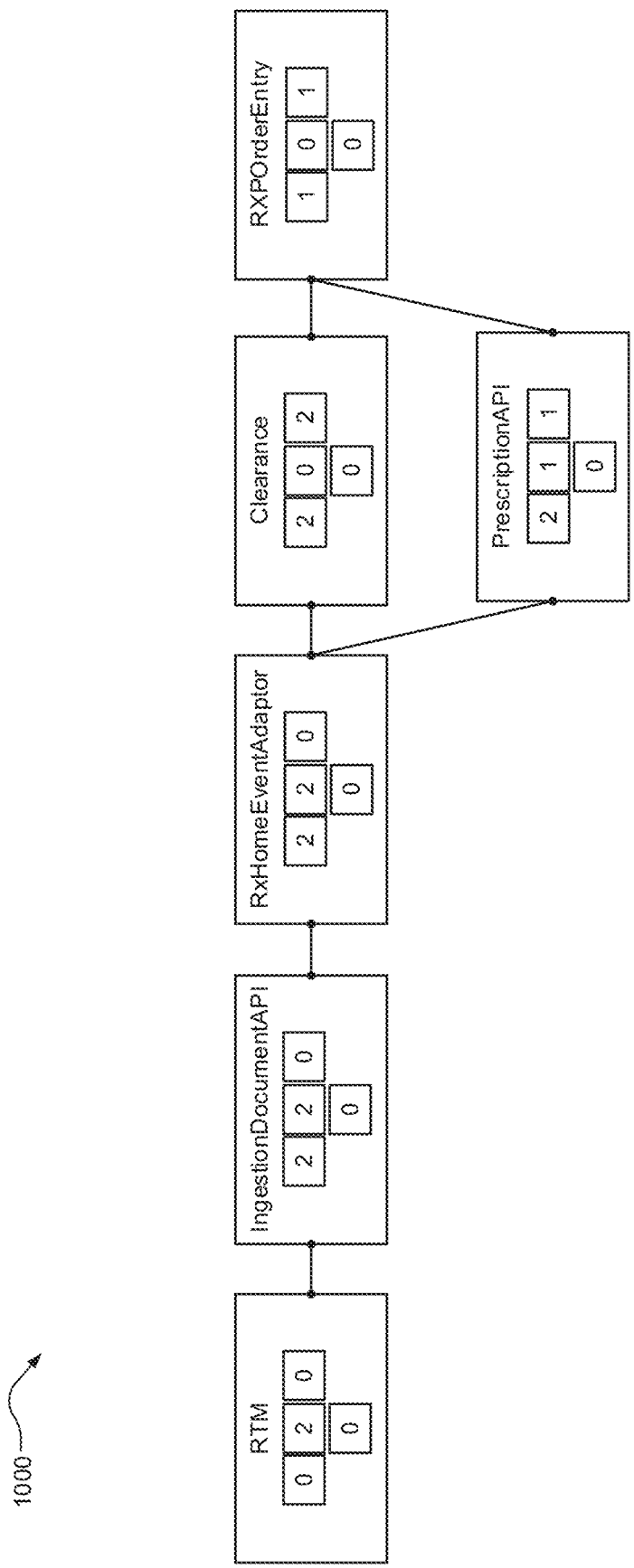
FIG. 10 is a block diagram depicting an example visualization of event counts at various microservices in a microservice architecture.

FIG. 10 is a block diagram depicting an example visualization 1000 of event counts at various microservices in a microservice architecture. For example, the event history visualization module 424 may display the visualization 1000 in FIG. 10 on a screen for monitoring, for a system administrator to view end of life and other suitable data about events flowing through the microservices.

FIG. 10 illustrates six example microservices (RTM, IngestionDocumentAPI, RxHomeAdaptor, Clearance, PrescriptionAPI and RXPOrder entry) for a prescription drug fill implementation. A fork occurs from the RxHomeEventAdaptor to the Clearance and PrescriptionAPI microservices, and a join occurs from the Clearance and PrescriptionAPI microservices to the RXPOrderEntry microservice. In other implementations, more or less microservices may communicate with one another in any suitable arrangement, including more or less (or none) of the forks and joins in the flow.

The visualization 1000 includes several status boxes in each microservice, which may correspond to different values of processes associated with the microservice. For example, the top three boxes in each microservice may indicate a number of events received at the microservice, a number of events currently being processed by the microservice, and a number of events published or otherwise transferred out by the microservice, respectively. Each of these values may indicate a number of events within a configurable recent time period, such as a most recent minute, a most recent hour, a most recent day, etc.

In various implementations, end of life values for events may be displayed in the visualization 1000 for each microservice. For example, the bottom box in each microservice application may indicate a number of events that were terminated, transmitted out of the system, etc., which may be referred to as end of life occurrences. Therefore, a system administrator may view the visualization to 1000 to determine how each microservice is performing in terms of its processing, events received, events reaching an end of life status at the microservice, etc.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
memory hardware configured to store structured microservice configuration data, structured event log data, and computer-executable instructions, wherein the structured microservice configuration data includes multiple microservice entries each associated with one of multiple microservice applications of a request processing architecture, and wherein the structured event log data includes multiple request data structures each including multiple event message entries associated with a correlation identifier; and
processor hardware configured to execute the instructions, wherein the instructions include:
accessing the structured microservice configuration data to identify the microservice applications of the request processing architecture, wherein the structured microservice configuration data specifies a flow of messages between the microservice applications in a flow path for a prescription fill request;
converting each step node within the flow path to a hash map;
subscribing to messages transmitted by the identified microservice applications for event monitoring;
receiving multiple messages transmitted by the identified microservice applications;
for each of the multiple received messages:
according to the structured microservice configuration data, analyzing one or more fields of the received message to determine a correlation identifier associated with the received message;
according to the determined correlation identifier, identifying one of the multiple request data structures; and
according to one or more fields of the received message, storing an event message entry in the identified request data structure;
determine throughput values for each of the multiple microservice applications according to input and output events each associated with one of the multiple microservice applications;
identify a subset of the multiple microservice applications having throughput values less than a specified bottleneck threshold value; and
transforming a user interface of a user device to display at least a portion of the multiple event message entries and the subset of the multiple microservice applications having throughput values less than the specified bottleneck threshold value.

2. The system of claim 1, wherein the instructions include:
obtaining message protocol data for each microservice application in the request processing architecture;
building a microservice configuration file according to the obtained message protocol data; and
storing the microservice configuration file in the structured microservice configuration data.

3. The system of claim 2, wherein building the microservice configuration file includes:
determining an operation sequence of the multiple microservice applications within the request processing architecture; and
ordering the multiple microservice entries in the microservice configuration file according to the determined operation sequence.

4. The system of claim 2, wherein building the microservice configuration file includes, for each microservice application in the request processing architecture:
identifying fields of a message transmitted by the microservice application; and
storing a microservice entry in the microservice configuration file according to the identified fields.

5. The system of claim 2, wherein building the microservice configuration file includes, for each microservice application in the request processing architecture:
determining whether correlation identifier information is present in a message transmitted by the microservice application; and
assigning a retrieval status to a microservice entry in the microservice configuration file in response to determining that correlation identifier information is not present in the message transmitted by the microservice application.

6. The system of claim 1, wherein the instructions further include, for each of the multiple received messages:
determining whether the one or more fields of the received message include sensitive data, according to the structured microservice configuration data; and
masking at least a portion of the one or more fields prior to storing the event message entry in the identified request data structure.

7. The system of claim 1, wherein determining the correlation identifier includes:
determining at least one of a name and a type of the received message;
scanning multiple microservice entries of the structured microservice configuration data to identify a match with at least one of the name and type of the received message; and
obtaining the correlation identifier according to the matched microservice entry.

8. The system of claim 1, wherein the multiple messages transmitted by the identified microservice applications are received via at least one event monitoring application programming interface (API).

9. The system of claim 8, wherein determining the correlation identifier includes:
determining whether an API retrieval status has been assigned to the received message, according to the structured microservice configuration data; and
executing an API call to the microservice application that transmitted the received message to obtain correlation identifier information, in response to determining that an API retrieval status has been assigned to the received message.

10. The system of claim 1, wherein transforming the user interface includes:
receiving a user input requesting a status associated with a specified one of the multiple request data structures;
obtaining a latest one of the multiple event message entries of the specified request data structure; and
modifying the user interface to display the microservice application associated with the latest one of the multiple event message entries.

11. The system of claim 1, wherein:
each request data structure is associated with a prescription drug fill request; and
the multiple microservice applications include a patient drug coverage confirmation microservice and a pharmacy fill location microservice.

12. A computerized method for automated non-intrusive event tracing in a microservice architecture, the method comprising:
accessing structured microservice configuration data to identify microservice applications of a request processing architecture, wherein the structured microservice configuration data includes multiple microservice entries each associated with one of multiple microservice applications of the request processing architecture, and the structured microservice configuration data specifies a flow of messages between the microservice applications in a flow path for a prescription fill request;
converting each step node within the flow path to a hash map;
subscribing to messages transmitted by the identified microservice applications for event monitoring;
receiving multiple messages transmitted by the identified microservice applications;
for each of the multiple received messages:
   according to the structured microservice configuration data, analyzing one or more fields of the received message to determine a correlation identifier associated with the received message;
   according to the determined correlation identifier, identifying one of multiple request data structures, wherein each of the multiple request data structures includes multiple event message entries associated with a specific correlation identifier; and
   according to one or more fields of the received message, storing an event message entry in the identified request data structure;
determining throughput values for each of the multiple microservice applications according to input and output events each associated with one of the multiple microservice applications;
identifying a subset of the multiple microservice applications having throughput values less than a specified bottleneck threshold value; and
transforming a user interface of a user device to display at least a portion of the multiple event message entries and the subset of the multiple microservice applications having throughput values less than the specified bottleneck threshold value.

13. The method of claim 12, further comprising:
obtaining message protocol data for each microservice application in the request processing architecture;
building a microservice configuration file according to the obtained message protocol data; and
storing the microservice configuration file in the structured microservice configuration data.

14. The method of claim 13, wherein building the microservice configuration file includes:
determining an operation sequence of the multiple microservice applications within the request processing architecture; and
ordering the multiple microservice entries in the microservice configuration file according to the determined operation sequence.

15. The method of claim 13, wherein building the microservice configuration file includes, for each microservice application in the request processing architecture:
identifying fields of a message transmitted by the microservice application; and
storing a microservice entry in the microservice configuration file according to the identified fields.

16. The method of claim 13, wherein building the microservice configuration file includes, for each microservice application in the request processing architecture:
determining whether correlation identifier information is present in a message transmitted by the microservice application; and
assigning a retrieval status to a microservice entry in the microservice configuration file in response to determining that correlation identifier information is not present in the message transmitted by the microservice application.

17. The method of claim 12, wherein the method further comprises, for each of the multiple received messages:
determining whether the one or more fields of the received message include sensitive data, according to the structured microservice configuration data; and
masking at least a portion of the one or more fields prior to storing the event message entry in the identified request data structure.

18. The method of claim 12, wherein determining the correlation identifier includes:
determining at least one of a name and a type of the received message;
scanning multiple microservice entries of the structured microservice configuration data to identify a match with at least one of the name and type of the received message; and
obtaining the correlation identifier according to the matched microservice entry.

19. The method of claim 12, wherein the multiple messages transmitted by the identified microservice applications are received via at least one event monitoring application programming interface (API).

20. The method of claim 19, wherein determining the correlation identifier includes:
determining whether an API retrieval status has been assigned to the received message, according to the structured microservice configuration data; and
executing an API call to the microservice application that transmitted the received message to obtain correlation identifier information, in response to determining that an API retrieval status has been assigned to the received message.

* * * * *